United States Patent [19]

Garitty

[11] Patent Number: 4,725,914
[45] Date of Patent: Feb. 16, 1988

[54] PROTECTIVE RELAY SYSTEM FOR PERFORMING SELECTIVE-POLE TRIP DETERMINATION

[75] Inventor: James P. Garitty, Coral Springs, Fla.

[73] Assignee: Westinghouse Electric Corp., Pittsburgh, Pa.

[21] Appl. No.: 942,334

[22] Filed: Dec. 16, 1986

[51] Int. Cl.[4] ............................................. H02H 3/38
[52] U.S. Cl. ...................................... 361/76; 361/64; 361/81; 361/87
[58] Field of Search .................... 361/47, 63, 64, 76, 361/80, 81, 87

[56] References Cited

U.S. PATENT DOCUMENTS

| | | | |
|---|---|---|---|
| 4,146,913 | 3/1979 | Sun | 361/76 |
| 4,275,429 | 6/1981 | Church et al. | 361/64 |
| 4,398,232 | 8/1983 | Elmore | 361/47 |
| 4,438,475 | 3/1984 | Haley | 361/82 |
| 4,536,815 | 8/1985 | Li et al. | 361/47 |
| 4,538,195 | 8/1985 | Elmore | 361/87 X |
| 4,538,196 | 8/1985 | Sun et al. | 361/64 |

OTHER PUBLICATIONS

W. L. Hinman et al., "A New Relaying System to Protect Series Compensated Lines", May 3-4, 1983, Presented to GIT Protective Relaying Conference.

Primary Examiner—A. D. Pellinen
Assistant Examiner—Derek S. Jennings
Attorney, Agent, or Firm—G. H. Telfer

[57] ABSTRACT

Apparatus for performing selective-pole trip determination is included in each protective relay of a current only monitoring protective relay system for protecting an electrical transmission segment of a power system network against faults. Current signals from the phases of the transmission segment are provided to a sequence network of the apparatus for conversion into positive and negative sequence component signals for each phase. A zero sequence component signal is also derived. A logic circuit is provided for each of the phases of the transmission segment and is governed by the corresponding sequence component signals and phase shifted variations thereof to detect a single-pole fault exclusively in the corresponding phase and generate a signal in response to the detection. An internal trip detection enables each phase logic circuit to generate its corresponding trip signal. Each protective relay further includes multi-phase trip logic circuitry governed by the positive, negative and zero sequence component signals and phase shifted variations thereof to generate phase-to-phase and phase-to-phase-to-ground fault signals.

10 Claims, 18 Drawing Figures

PROTECTIVE RELAY SYSTEM FOR PERFORMING SELECTIVE-POLE TRIP DETERMINATION

BACKGROUND OF THE INVENTION

The present invention relates to protective relay systems for protecting a three-phase electrical power transmission segment of a power system network against faults, in general, and more particularly to a protective relay system operative to perform selective-pole trip determination utilizing positive, negative, and zero sequence components of the phase currents monitored at each end of the segment.

In an electrical power system network, electrical energy is generally transmitted from the one point to another over one or more three-phase transmission segments. To protect the power system, some electrical utilities are presently using current differential relay systems, like the LCB manufactured by Westinghouse Electric Corporation, for example, to sense internal faults within the three-phase segments and isolate the faulted segments from the network. In these LCB type systems, protective relays and corresponding power circuit breakers are coupled at each local and remote end of a transmission segment. The local and remote protective relays communicate with each other over one or more communication channels to detect a fault internal to the segment which they are protecting and to operate the corresponding circuit breakers to interrupt current through the protected segment in response to a detected internal fault.

A typical current differential relay system is disclosed in the U.S. Pat. No. 4,275,429 issued June 23, 1981 to Larry L. Church et al. and entitled "Protective Relay Apparatus" which is incorporated by reference herein for the purpose of providing a more detailed description of such a relaying system. Briefly, the aforementioned patent teaches that each local and remote protective relay of a protected line segment monitors its corresponding phase currents and generates signals representative thereof. Each set of phase current signals are converted into local and remote composite sequence signals which are transmitted correspondingly between the local and remote protective relays through a communication channel. Each protective relay compares the local and remote composite sequence signals to detect an internal fault in the protected segment.

One drawback of the LCB or an equivalent relay system is that it cannot segregate an internal fault to a particular phase of the protected segment, rather it detects only an internal fault and causes a three-phase fault trip. It is preferred to have independent-pole operation of the power circuit breakers in which case the faulted phase or phases of a segment would have to be individually and separately detected, the operation of which is commonly referred to as selective-pole trip determination. In such a protective relay system, the circuit breaker at each end of the protected segment can be operated to independently trip and clear only the faulted phase or phases of the segment leaving the other unfaulted phase(s) in service.

Typical of the current only monitoring relay systems which are capable of providing selective-pole trip determination is the segregated phase comparison units (SPCU) manufactured by Westinghouse Electric Corporation and described in the Westinghouse Paper "A New Relaying System to Protect Series Compensated Lines" authored by W. L. Hinman et al. and presented to Georgia Institute of Technology at the Protective Relaying Conference, May 3–4, 1973. Briefly, Westinghouse's SPCU system compares the monitored phase currents of one end of the protected segment with respectively corresponding monitored phase currents of the other end of the segment at each protective relay to detect an internal fault and isolate the faulted phase. However, to accomplish the three-phase current comparisons, the SPCU system requires three separate communication channels or some sophisticated multiplexing arrangement for a single communication channel, both configurations posing other undesirable conditions.

Another drawback resulting from current only monitoring protective relaying systems, such as the SPCU, for example is isolating the faulted phase under the conditions of heavy load current or high fault resistance or a combination thereof. If the load current is too large, the protective relay may be fooled into determining falsely that an actual internal fault is an external fault and defor tripping. A similar condition may occur with high impedance faults in which case the faulted current may be substantially smaller than the load current resulting in a sustaining current outfeed from the protected segment. A combination of both high current and high fault resistance merely compounds the problem. In fact, such a combination may, in some cases, shift the phases of the currents in such a fashion as to make a phase-to-ground fault appear as a phase-to-phase-to-ground fault.

Accordingly, applicant's invention is intended to improve upon the present current only monitoring protective relaying systems which offer selective-pole trip determination operation, especially with regard to the aforementioned drawbacks.

SUMMARY OF THE INVENTION

A current only monitoring protective relay system protects an electrical energy transmission segment of a power system network against faults. The segment comprises three phases A, B, and C and has local and remote ends. The relay system includes current measuring devices for each local and remote end of the segment to measure the current of each of the phases A, B, and C at its corresponding end and generate phase current signals Ia, Ib, and Ic representative thereof; and local and remote protective relays which are responsive to the phase current signals Ia, Ib, and Ic correspondingly associated therewith to detect an internal fault condition of the segment and to generate an internal trip signal indicative of the condition., In accordance with the present invention, each protective relay includes apparatus for performing selective-pole trip determination which includes a sequence network, and first, second and third logic circuits. The sequence network converts the corresponding phase current signals Ia, Ib, and Ic into positive and negative sequence components Ia1 and Ia2, respectively, for phase A, Ib1 and Ib2, respectively, for phase B and Ic1 and Ic2, respectively, for phase C and into a zero sequence component signal I0. The first logic circuit is governed by the internal trip signal and the sequence component signals Ia1, Ia2 and I0 and phase shifted variations thereof to detect a single-pole fault exclusively in phase A and to generate a signal φA in response to the detection. Similarly, the second logic circuit is governed by the internal trip signal and the sequence component signals Ib1, Ib2, and I0 and phase shifted variations thereof to detect a single-pole fault exclusively in phase B and to generate a single $\phi$B in response to the detection. Moreover, the third logic circuit is governed by the internal trip signal and the sequence component signals Ic1, Ic2, and I0 and phase shifted variations thereof to detect a single-pole fault exclusively in phase C and to generate a signal $\phi$C in response to the detection.

In addition to the single-pole trip logic circuits described hereabove, each protective relay further includes multi-phase trip logic circuitry which is governed by the aforementioned positive, negative and zero sequence component signals and phase shifted variations thereof to generate phase-to-phase fault signals and phase-to-phase-to-ground fault signals for the corresponding combinations of the three-phase transmission segment. The above-described single pole logic circuity of the protective relay is operative to generate various blocking signals which are logically interconnected in the multi-phase logic circuitry to block the generation of the multi-phase trip signals. In addition, the multi-phase logic circuitry is operative to detect and generate a phase-to-phase fault signal exclusive of a phase-to-phase-to-ground fault signal and vice-versa. In all cases, an internal trip determination enables the multi-phase fault signal generating circuits.

DESCRIPTION OF THE PREFERRED EMBODIMENT

Figure 1:
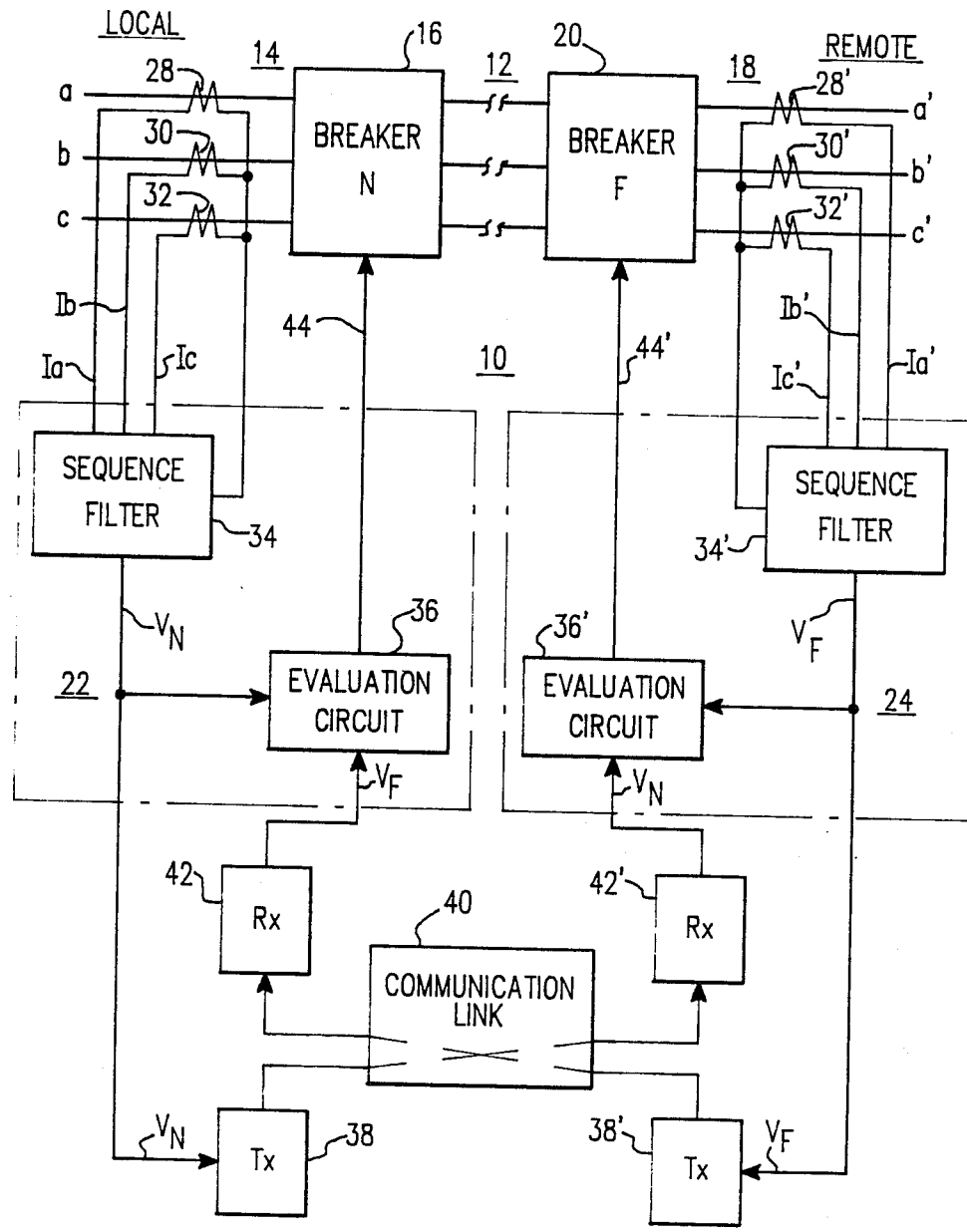
FIG. 1 is a block diagram schematic exemplifying an embodiment of a current only monitoring LCB-type protective relay system which is presently being used in the industry.

A block diagram schematic exemplifying an embodiment of a current only monitoring LCB type protective relay system 10 is shown in FIG. 1, A protected transmission line segment 12 includes three phases a, b and c and local and remote ends, 14 and 18, respectively. Local and remote three-phase power circuit breaker units 16 and 20 are disposed respectively at the local 14 and remote 18 ends of the line segment 12. The breakers 16 and 20 are operative to interrupt current simultaneously through the three phases a, b and c of the segment 12 and isolate the segment 12 from the remaining portion of the power system network. Current measuring apparatus in the form of three current transformers 28, 30 and 32 are coupled respectively to the phases a, b and c of the segment 12 at the local end 14. Similarly, a like number of current transformers 28', 30' and 32' are coupled to the phases a', b' and c' of the segment 12 at the remote end 18 thereof.

Conventional protective relaying apparatus 22 and 24 are further disposed respectively at the local and remote ends 14 and 18, respectively, of the segment 12. Phase current signals Ia, Ib, and Ic representative of the current messurements of the transformers 28, 30 and 32. respectively, are coupled to a composite sequence filter 34 disposed in the protective relay 22. Likewise, phase current signals Ia', Ib' and Ic' representative of the phase current measurements of the transformers 28', 30' and 32' are coupled to a composite sequence filter 34' disposed in the protective relay 24. The composite sequence filters 34 and 34' may be similar to the type disclosed in the U.S. Pat. No. 4,146,913 issued Mar. 27, 1979 to Shan C. Sun, entitled "Symmetrical Component Sequence Filter" and assigned to the same assignee as that of the instant application. Each filter 34 and 34' converts its corresponding phase current signals into a composite sequence signal or voltage denoted as $V_N$ for the local protective relay 22 and $V_F$ for the remote protective relay 24.

Each protective relay 22 and 24 communicates its derived three-phase composite sequence voltage $V_N$ and $V_F$ and to each other over a conventional communication channel. In the present embodiment, the communication channel comprises a transmitter 38 and receiver 42 disposed at the protective relay 22 and similarly, a transmitter 38' and receiver 42' disposed at the protective relay 24. The transmitters and receivers communicate with each other through a conventional communication link 40.

In the protective relay 22, the derived composite sequence signal $V_N$ and the received composite sequence signal $V_F$ are compared in an evaluation circuit 36 for detecting whether or not an internal fault is present on the transmission segment 12 (refer to the incorporated U.S. Pat. No. 4,275,429 for operational details). Similarly, in protective relay 24, the derived signal $V_F$ is compared with the received signal $V_N$ in a similar evaluation circuit 36'which performs the same function as the circuit 36. When an internal fault is detected by the protective relays 22 and 24, internal trips signal 44 and 44' are generated respectively by the evaluation circuits 36 and 36' for operating the breakers 16 and 20 to cause a three-phase current interruption in the segment 12 at both the local 14 and remote 18 ends thereof. For a more detailed description of this LCB type protective relay system reference is made to the above cited U.S. Pat. No. 4,275,429 which is incorporated by reference herein.

Figure 2:
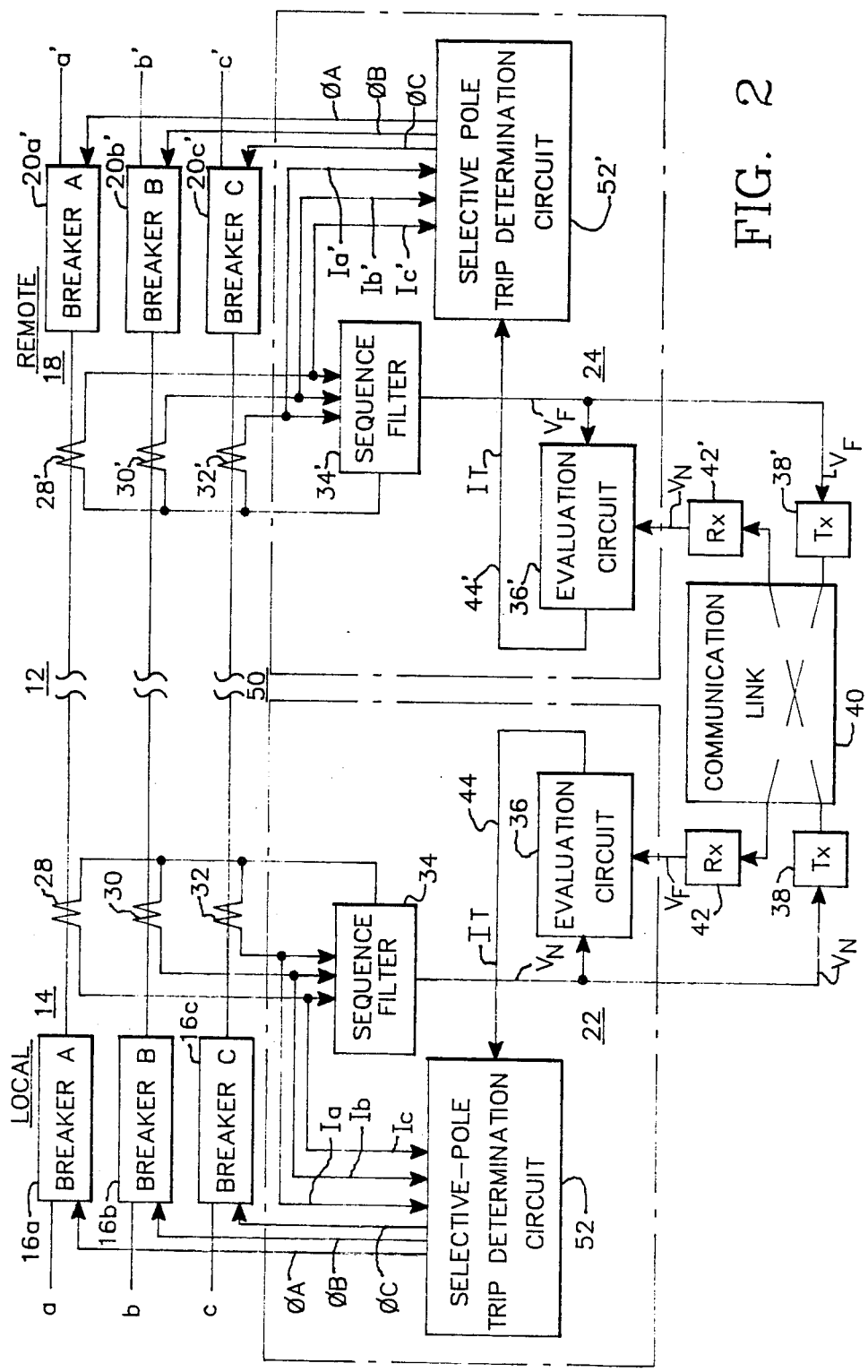
FIG. 2 is a block diagram schematic embodiment of a newly proposed current only monitoring protective relay system suitable for embodying the principle of the present invention.

As pointed out in the Background section hereabove, present LCB type protective relay systems are incapable of performing selective-pole trip determinations for interrupting current through selected phases of the transmission segment 12. In accordance with the present invention, a new protective relay system 50 is proposed and a block diagram schematic of an embodiment thereof is depicted in FIG. 2. The same reference numerals will be used for the functional elements common to the embodiments of both the present relay system described in connection with FIG. 1 and the newly proposed relay system depicted in FIG. 2. The functional operation of these common elements will remain the same as that described for the embodiment of FIG. 1.

Referring to FIG. 2, the three-phase breaker units 16 and 20 include separately and individually operated single-pole breaker units, 16a, 16b and 16c for breaker 16 and 20a', 20b' and 20c' for breaker 20. In addition, apparatus 52 for performing selective-pole trip determination is added to the protective relay 22. The apparatus 52 is governed by the phase current signals Ia, Ib, and Ic and the internal trip signal 44 generated by the evaluation circuit 36 to generate single-pole trip signals $\phi A$, $\phi B$, and $\phi C$ for operating the single-pole breaker units 16a, 16b and 16c, respectively. Similar apparatus 52' is included in the protective relay 24 and governed by phase current signals much the same as that described for protective relay 22 to generate similar single-pole trip signals to operate the breaker units 20a', 20b' and 20c'.

Figure 3:
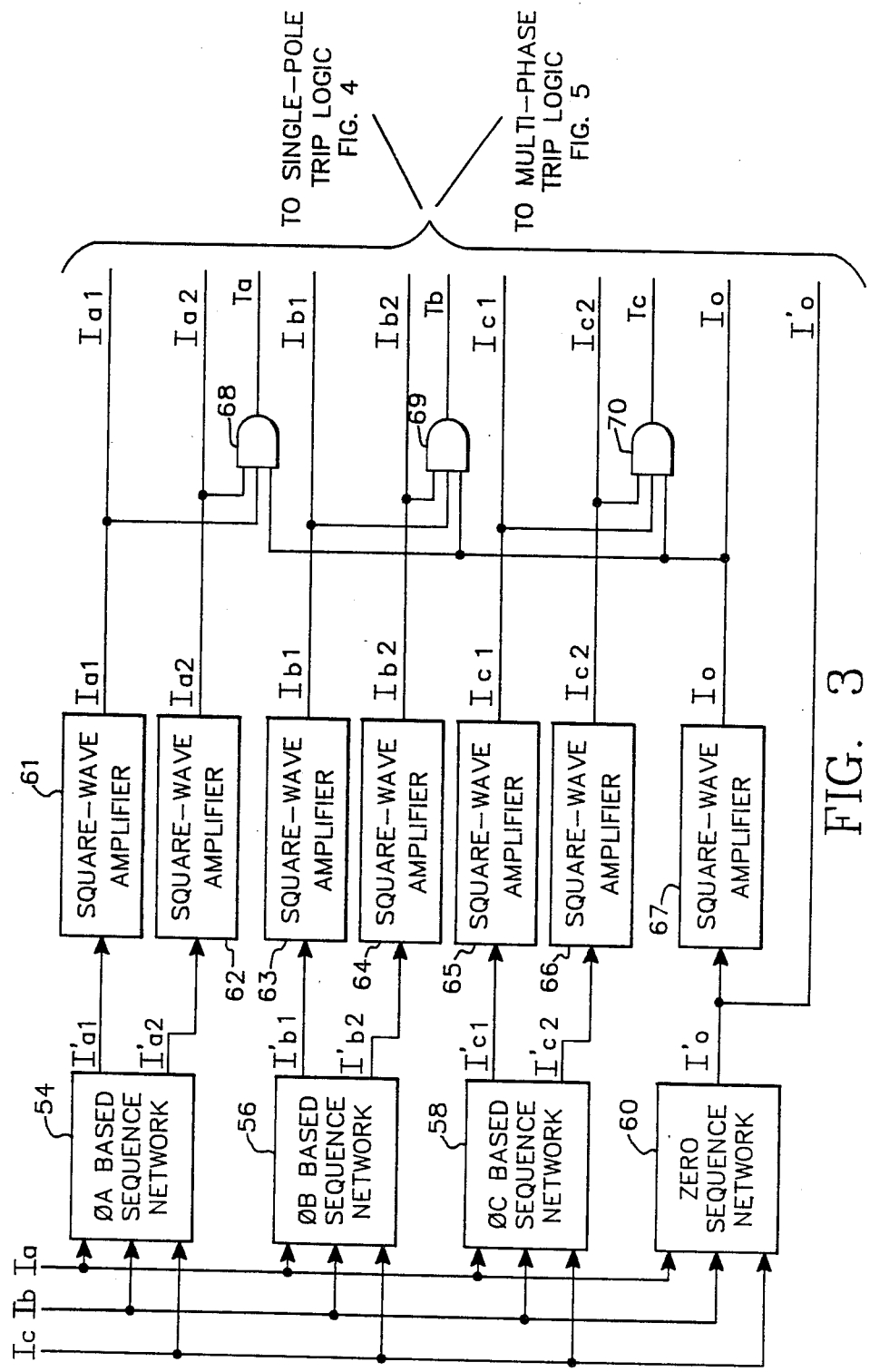
FIGS. 3, 4, and 5 taken together form a composite block diagram schematic embodiment suitable for embodying the selective-pole trip determination apparatus of the protective relays depicted in the embodiment of FIG. 2.
Figure 4:
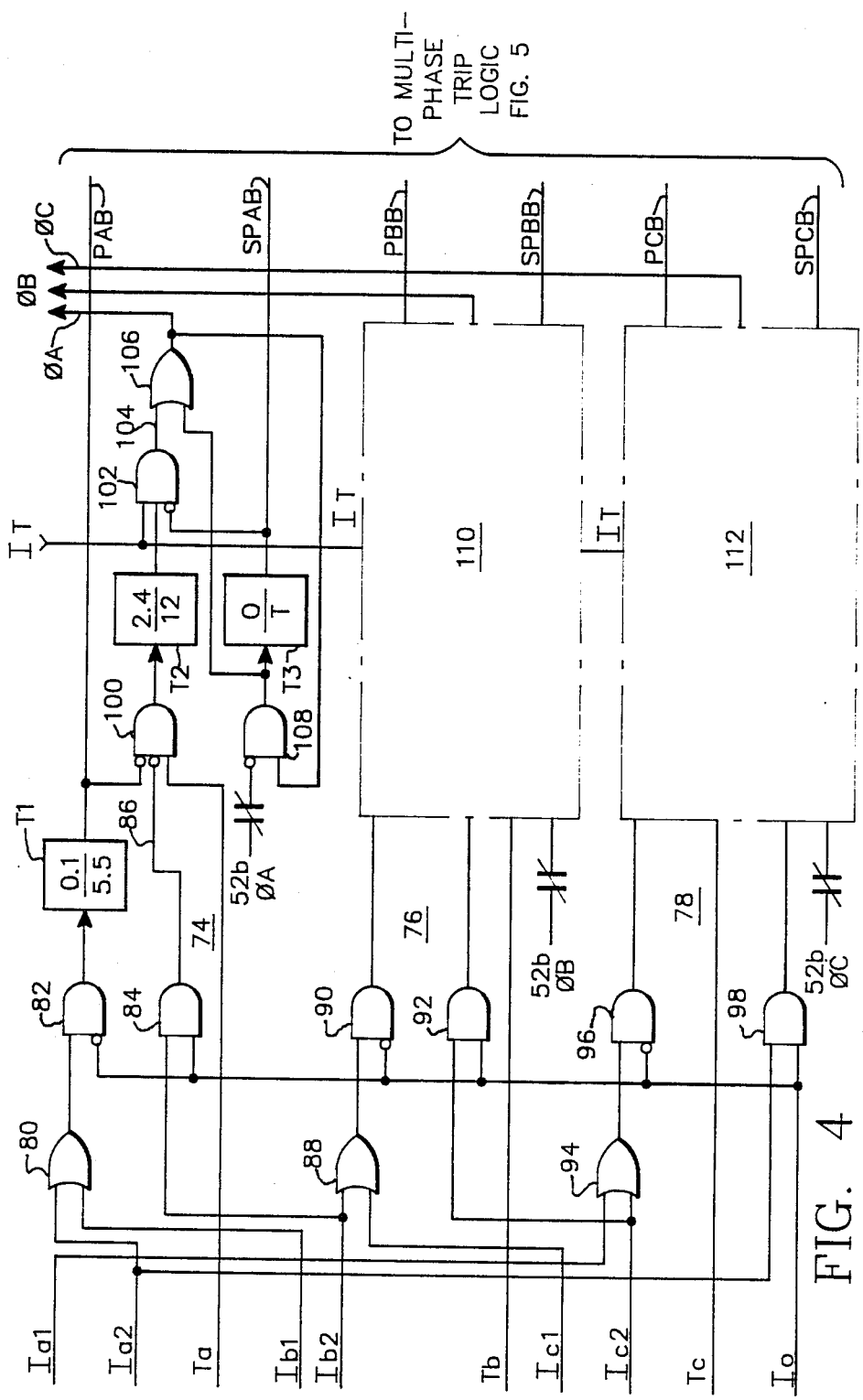
Figure 5:
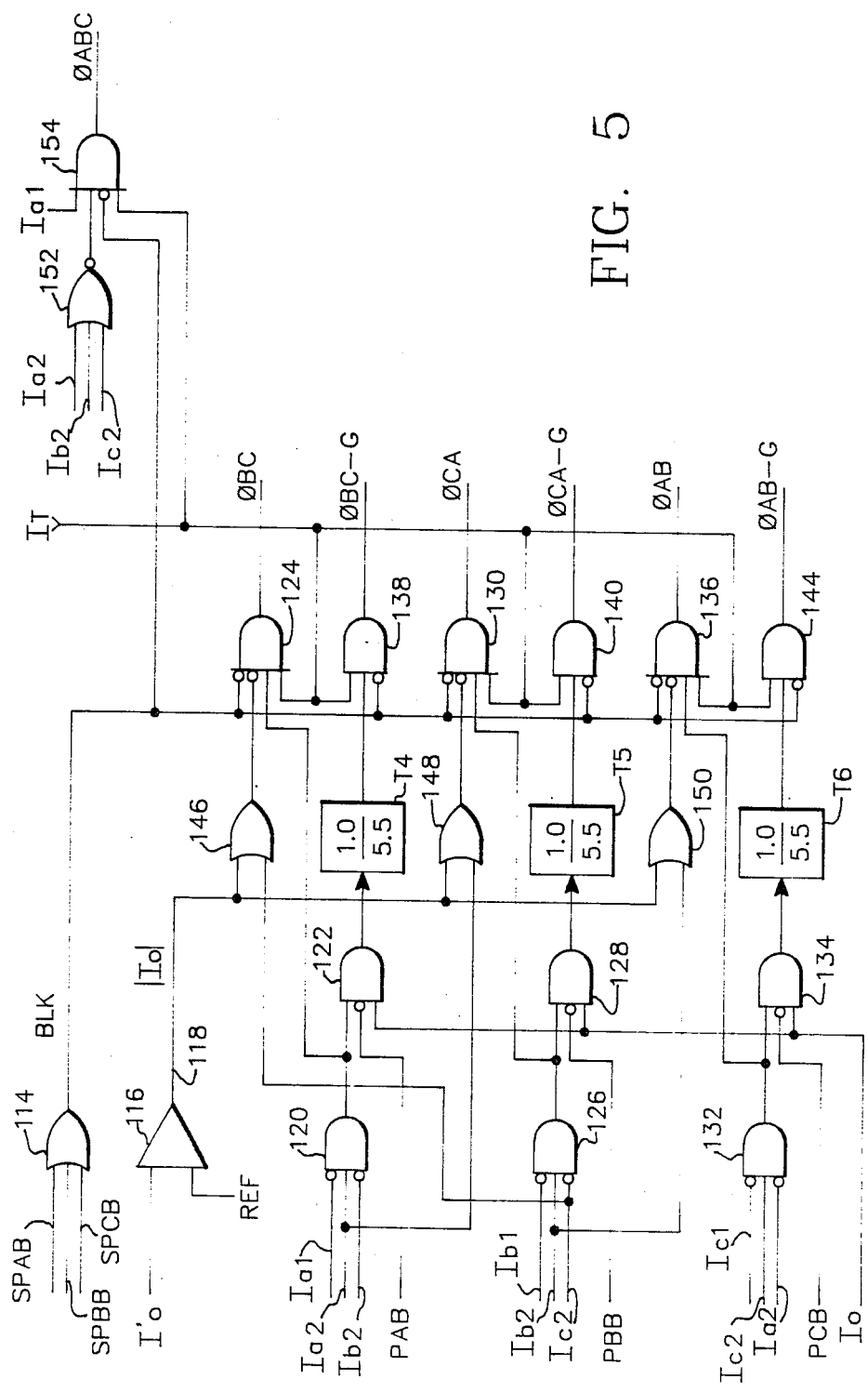

A suitable embodiment of the apparatus 52 and 52' is shown in the composite block diagram schematic of FIGS. 3, 4 and 5. Referring to FIG. 3, the three-phase current signals Ia, Ib, and Ic (Ia', Ib', Ic') are coupled to each of three sequence networks 54, 56 and 58 which may be of the type described in the U.S. Pat. No. 4,146,913 which was cited hereabove and is incorporated by reference in the instant application. The sequence network 54 converts the phase current signals into positive I'a1 and negative I'a2 sequence component signals based on phase a; sequence network 56 converts the phase current signals into positive I'b1 and negative I'b2 sequence component signals based on phase b; and similarly, sequence network 58 converts the phase current signals into positive I'c1 and negative I'c2 sequence component signals based on phase c. A conventional zero sequence component network 60 is also disposed in the apparatus 52 (52') for converting the phase current signals into their zero sequence component signal I'o.

Square wave amplifiers 61-67 are provided to convert respectively the sequence component signals I'a1, I'a2, I'b1, I'b2, I'c1, I'c2, and I'o into corresponding square waveform signals Ia1, Ia2, Ib1, Ib2, Ic1, Ic2, and Io, each having first and second states which are more commonly referred to as high and low states. Examples of the square waveform signals are depicted in the waveforms a–g of FIGS. 6–18. The waveform transitions between the first and second states represent phase angle relationships of the sequence component signals with respect to each other as shown by the waveforms a–g in the aforementioned figures. Each of the positive and negative sequence component signals of phases a, b and c are coupled respectively to inputs of AND gates 68, 69 and 70. A third input of the AND gates 68, 69 and 70 is coupled to the zero sequence component signal Io. Each of the AND gates 68, 69 and 70 is operative to detect substantial coincidence of the corresponding positive, negative and zero sequence component signals coupled to its input to generate a provisional single-pole fault signal Ta, Tb, and Tc, respectively. The aforementioned square waveform sequence component signals and provisional single-pole fault signals are provided to single-pole trip logic circuitry depicted in FIG. 4 and to multi-phase trip logic circuitry depicted in FIG. 5.

Referring to FIG. 4, in the single-pole trip logic circuitry, there is provided three basically similar logic circuits 74, 76 and 78 for detecting a single-pole fault exclusively in one of the respectively corresponding phases a, b and c to generate a single-pole trip signal $\phi A$, $\phi B$, $\phi C$ corresponding in response to a fault detection. Before describing the circuitry depicted in FIG. 4, a technical discussion explaining the reasoning behind the circuit configuration is deemed to be helpful.

As described in connection with FIG. 3, three sets of sequence components are derived from three separate sequence networks 54, 56 and 58, each set being coupled to the inputs of the AND gates 68, 69 and 70 to effect the provisional fault signals Ta, Tb and Tc which in the ideal case represent a detection of a corresponding single phase-to-ground fault. However, for non-ideal type faults, this single phase fault detection scheme may result in false tripping. For example, with a two phase-to-ground fault with high fault resistance, the positive and negative sequence component signals and zero sequence component signal could be within 30° phase of each other which would incorrectly trigger the AND gates 68, 69 and 70 into effecting the corresponding single-pole fault signal, i.e. substantial coincidence. Also the case of a single phase-to-ground weak-feed fault with high fault resistance and a large amount of load current may cause the positive, negative and zero sequence component signals of a given set corresponding to the faulted phase to be as much as 120° out of phase with respect to each other. These two examples indicate clearly a need for additional circuitry to detect non-ideal conditions and block the generation of a single-pole trip signal accordingly.

Two such blocking components may be expressed logically as follows:

$$(a^2 I\phi + I\phi 2)\cdot \overline{Io}, \text{ and} \tag{1}$$

$$aI\phi 2 \cdot Io, \tag{2}$$

where:
  $\phi$ represents phase a, b or c,
  $I\phi 1$, $I\phi 2$, $Io$ represent the positive, negative and zero sequence square waveform components of each phase, $$a = 1 < 120°, \tag{1}$$

$$a^2 = 1 < 240°, \tag{4}$$

$$+ = (\text{OR}) \text{ logic operator, and} \tag{5}$$

$$\cdot = (\text{AND}) \text{ logic operator} \tag{6}$$

In the above two expressions (1) and (2), the components $I\phi 1$ and $I\phi 2$ are phase shifted by 240° and 120° respectively. Rather than performing these phase shifts with circuitry, it is recognized that because of the phasor relationships which exist between the sequence component signals, other sequence component signals may be substituted to create equivalent phase shifted sequence component signal expressions. Given the following well known phasor conversion relationships:

$$a^2 \text{ Ia1} = \text{Ib1} \tag{7}$$

$$a^2 \text{ Ib1} = \text{Ic1} \tag{8}$$

$$a^2 \text{ Ic1} = \text{Ia1, and} \tag{9}$$

$$a \text{ Ia2} = \text{Ib2}, \tag{10}$$

$$a \text{ Ib2} = \text{Ic2, and} \tag{11}$$

$$a \text{ Ic2} = \text{Ia2}, \tag{12}$$

the above expressions (1) and (2) may be expressed for each phase as follows:
  for phase A $$(\text{Ib1} + \text{Ia2}) \cdot \overline{\text{Io}} \tag{13}$$

$$\text{Ib2} \cdot \text{Io}, \tag{14}$$

for phase B $$(Ic1+Ib2)\cdot \overline{Io} \quad (15)$$

$$Ic2\cdot Io, \text{ and} \quad (16)$$

for phase C $$(Ia1+Ic2)\cdot \overline{Io} \quad (17)$$

$$Ia2\cdot Io \quad (18)$$

The foregoing expressions (13) through (18) are used for the embodiment of the three logic circuits 74, 76 and 78.

More specifically, for the logic circuit 74 shown in FIG. 4, the signals Ia2 and Ib1 are coupled to the inputs of an OR gate 80, the output of which being coupled to one input of an AND gate 82. The signal Io is coupled to an inverting input of the AND gate 82. The combination of logic gates 80 and 82 embody expression (13).

A timer T1 is disposed at the output of the AND gate 82 to effect a first blocking signal denoted as PAB. The timer T1 is functionally designated with one number, 0.1, displayed over another number, 5.5, with both of the numbers representing milliseconds in time. The upper figure 0.1 represents a delay with respect to the leading edge of the output signal of AND gate 82, i.e. low to high state transition, and the lower figure 5.5 represents the delay with respect to the falling edge of the same signal, i.e. high to low state transition. The 0.1 millisecond delay of T1 acts to filter out high frequency noise spikes which may appear at the output of the AND gate 82. On the other hand, the 5.5 millisecond delay extends the generation of the first blocking signal PAB for 5.5 milliseconds or approximately 120° in phase beyond the time when the logical combination created by the signal inputs to the gates 80 and 82 (i.e. expression (13)) cease to exist. An AND gate 84 logically combines the signals Ib2 and Io to embody the expression (14) and to effect a second blocking signal 86.

The OR gate 88 and AND gates 90 and 92 of logic circuit 76 and the OR gate 94 and AND gates 96 and 98 of logic circuit 78 include inputs consistent with their respective expressions (15), (16) and (17), (18) found above and function similarly to the OR gate 80 and AND gates 82 and 84 of logic circuit 74 to effect first and second blocking signals in each case. The first blocking signals of circuits 76 and 78 are denoted as PBB and PCB, respectively.

Referring back to logic circuit 74, the first and second blocking signals and provisional single-pole fault signal for phase a govern the generation of the corresponing single-pole trip signal $\phi A$ in the remaining circuitry of logic circuit 74. More specifically, the first and second blocking signals PAB and 86, respectively, are coupled to inverting inputs of an AND gate 100 and the provisional trip signal Ta is coupled to a non-inverting input thereof. The output of AND gate 100 is coupled to a timer circuit T2 having the conventional denotation of leading edge delay over the falling edge delay. In effect, the timer T2 requires the output of the AND gate 100 to remain in the high state for a predetermined time, say 2.4 milliseconds, for example, before the timer will generate an output signal. However once generated the timer T2 extends the generation of its output beyond the time when the output signal of the AND gate 100 ceases to exist, i.e. falls from a high to a low state. In the present embodiment this delay time extension may be on the order of 12 milliseconds. The intermediate signal output of timer T2 and the internal trip signal IT from the evaluation circuit of the protective relay are coupled to inputs of another AND gate 102 to effect a signal 104 which causes the generation of the single-pole trip signal $\phi A$ via an OR gate 106.

The remaining circuitry of the logic circuit 74 perform the functions of sealing-in the generation of the single-pole trip signal $\phi A$ and generating a third blocking signal denoted as SPAB. More specifically, the output of OR gate 106 is coupled to an input of another AND gate 108. A breaker status signal may be generated by monitoring a normally-closed contact, conventionally denoted as 52b, in the breaker unit 16a. The 52b contact may be coupled to an inverting input of the AND gate 108. The output of the gate 108 is coupled to another input of the OR gate 106 to seal-in the generation of signal $\phi A$ and is also coupled to a third timer circuit T3. The leading edge delay, of the timer T3, denoted as zero, is considered nominal and the following edge delay, denoted as T, is dependent on transmission line characteristics and power circuit breaker operation. The output of timer T3 is the third blocking signal SPAB which is coupled to an inverting input of AND gate 102 for blocking the generation of the single-pole trip signal $\phi A$.

The foregoing described circuitry for logic circuit 74 is repeated in the dot-dash blocks 110 and 112 for logic circuits 76 and 78, respectively. Thus, logic circuits 76 and 78 produce their corresponding single-pole trip signals $\phi B$ and $\phi C$ and also their corresponding first and third blocking signals, i.e. PBB and SPBB for circuits 76 and PCB and SPCB for circuit 78. The first and third blocking signals of each of the circuits 74, 76 and 78 along with the positive, negative and zero sequence component signals of the three phases as well as the provisional single-pole trip signals are all provided to the multi-phase trip logic portion of the apparatus 52 (52') as depicted in FIG. 5.

Referring to FIG. 5, the third blocking signals SPAB, SPBB, and SPCB are logically combined in an OR gate 114 to effect an overall blocking signal denoted as BLK. In addition, the zero sequence component signal I'o is coupled to a comparator circuit 116 where it is compared with a reference signal, denoted as REF. The comparator 116 generates a logic signal over a signal line 118 when the amplitude of the zero signal component signal I'o is greater than the reference signal REF at its inputs.

Further describing the multi-phase trip logic circuitry of FIG. 5, a first AND gate 120 has coupled to an inverting input the signal Ia1, to a non-inverting input the signal Ia2, and coupled to another inverting input the signal Ib2. The output of the AND gate 120 is coupled to one input of another AND gate 122 and an input of another AND gate 124. A second AND gate circuit 126 has coupled to an inverting input the signal Ib1, to a non-inverting input the signal Ib2 and to another inverting input the signal Ic2. The output of the AND gate 126 is coupled to one input of an AND gate 128 and also to one input of another AND gate 130. A third AND gate circuit 132 has coupled to an inverting input the signal Ic1, to a non-inverting input the signal Ic2, and to another inverting input the signal Ia2. The output of the AND gate 132 is coupled to one input of an AND gate 134 and also to an input of another AND gate 136.

The blocking signals PAB, PBB, and PCB are coupled to inverting inputs of the AND gates 122, 128 and 134, respectively. In addition, the zero sequence component signal Io is coupled commonly to another input of the AND gates 122, 128 and 134 which are coupled respectively to timer circuits T4, T5 and T6 which are each set to have a leading edge delay of approximately 1 millisecond and a falling edge delay of approximately 5.5 milliseconds. The outputs of the timer circuits T4, T5 and T6 are coupled respectively to an input of AND gates 138, 140 and 144. The internal trip signal IT is coupled to an input of each of the AND gates 124, 138, 130, 140, 136, and 144.

The signals coupled to the non-inverting inputs of the aforementioned AND gates cause the AND gate to generate a corresponding phase-to-phase trip signal or phase-to-phase-to-ground trip signal as the case may be. For example, AND gates 124, 130 and 136 may generate phase-to-phase trip signals $\phi BC$, $\phi CA$ and $\phi AB$ for phases BC, CA, and AB, respectively. And, AND gates 138, 140 and 144 may generate phase-to-phase-to-ground trip signals $\phi BC$-G, $\phi CA$-G, and $\phi AB$-G for the phases BC, CA, and AB, respectively. The blocking signal BLK is coupled to an inverting input of each of the AND gates 124, 138, 130, 140, 136 and 144 to block the generation of the corresponding trip signal when any one of the blocking signals SPAB, SPBB, or SPCB is generated.

Still further, the signal 118 is logically combined with the signal Ic2 at the inputs of an OR gate 146, the output of which is coupled to an inverting input of the AND gate 124 to provide a block to the generation of the corresponding trip signal. The signal 118 is also logically combined with the signal Ia2 at the inputs of an OR gate 148, the output of which being coupled to an inverting input of the AND gate 130 to block the generation of the corresponding trip signal. And finally, the signal 118 is logically combined with the signal Ib2 at the inputs of an OR gate 150, the output of which being coupled to an inverting input of the AND gate 136 to provide a block to the generation of its corresponding trip signal.

Still referring to the circuitry of FIG. 5, the negative sequence component signals Ia2, Ib2, and Ic2 are coupled to a NOR gate 152, the output of which being coupled to one input of another AND gate 154. The blocking signal BLK is coupled to an inverting input of the AND gate 154 and two other inputs thereof are coupled to the signals IT and Ia1. The logical combination of the aforementioned signal inputs to the AND gate 154 effect a three-phase fault signal denoted as $\phi ABC$.

The time waveform graphs of FIGS. 6–18 exhibit a variety of operational examples for the selective-pole trip determination apparatus 52 (52'). In each FIG. 6–18, the waveforms a, b, and c depict the squared waveforms of the positive sequence component signals for the phases a, b and c respectively. Similarly, the waveforms d, e and f depict the squared waveforms of the negative sequence component signals of the phases a, b and c. The waveform g in each case depicts the squared waveform of the zero sequence component signal. For the time waveform graphs of FIGS. 6–15, the waveform h depicts the output of the AND gate 82, the waveform i the output of the timer T1 inverted, the waveform j the output of the AND gate 84 inverted and the waveform k the ouput of the AND gate 68. Thus, the waveforms i, j and k represent the logical combination of the non-inverted inputs of the AND gate 100 of circuit 74. Likewise, the waveforms m, n and o represent the non-inverted inputs of the AND gate 100 for circuit 76 and waveforms q, r and s represent the non-inverted inputs of the AND gate 100 for the circuit 78. Thus, the aforementioned three sets of waveforms should be observed closely to determine whether or not a single-pole trip has been exclusively detected.

Figure 6:
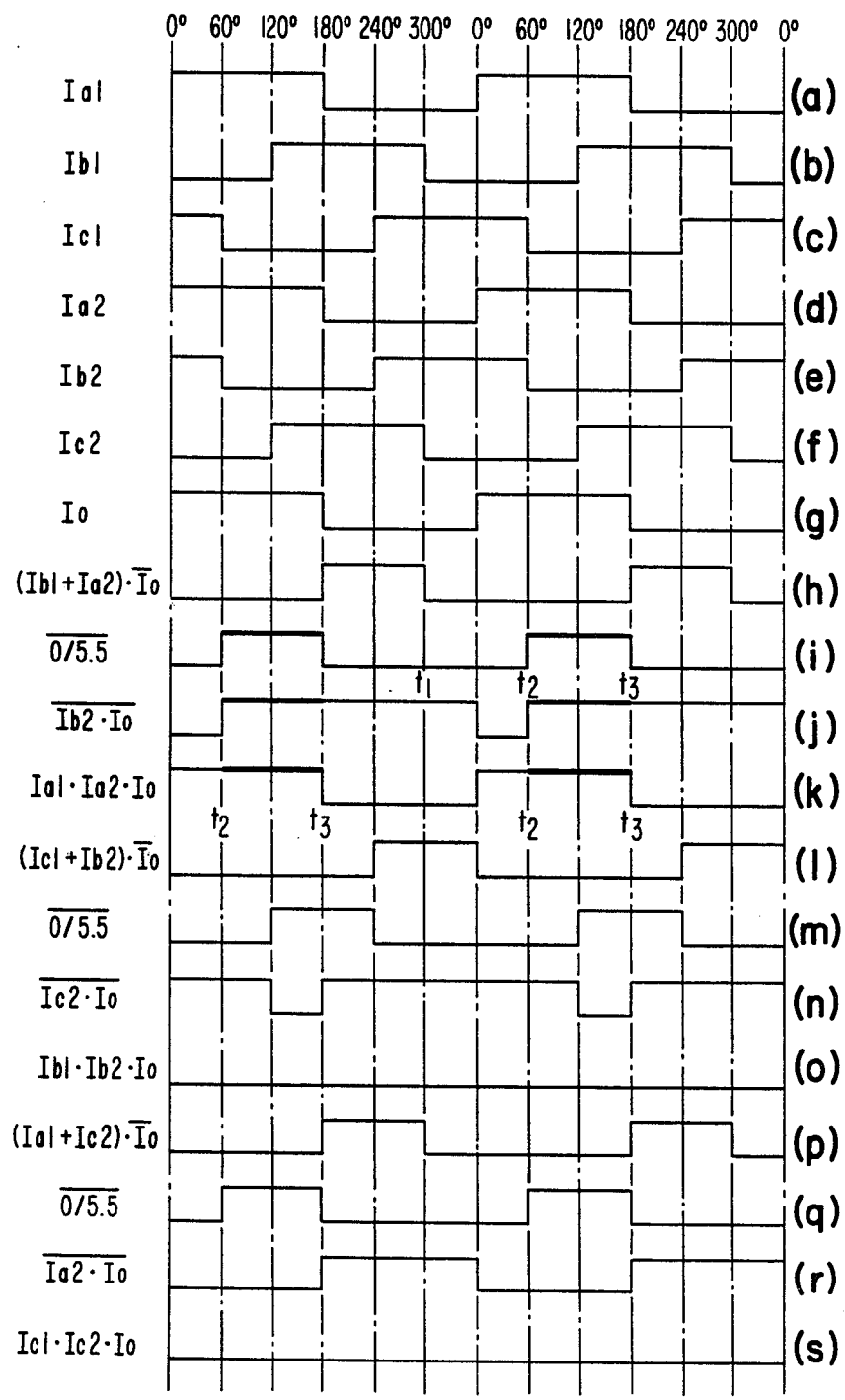
FIGS. 6-18 each include a plurality of signal time waveforms representative of a different condition under which the selective-pole trip determination embodiment may operate.

The first operational example, which is depicted in FIG. 6, illustrates a phase a-to-ground fault with no substantial load current. Note that, in waveform i, the delay time form t1 to t2 is indicative of the 5.5 millisecond delay of timer T1. Note also that, between the times t2 and t3, the logical combination of the waveforms i, j and k shown darkened in FIG. 6 cause the AND gate 100 to produce an output, i.e. maintain a high state logically. Since this logical combination between times t2 and t3 extends beyond 2.4 milliseconds or approximately 52° in phase, a single-pole trip signal $\phi A$ is produced through the circuit elements T2, 102 and 106 and is extended for 12 ms beyond the time the logical combination ceases to exist by timer T2. Observing the other sets of waveforms m, n, and o and q, r, and s, clearly no such logical combination condition exists for the necessary time duration.

Referring to FIG. 4, upon the generation of the single-pole trip signal $\phi A$, the breaker A is selectively and exclusively operated, thus opening the contacts 52b and enabling the AND gate 108 which responds to the trip signal $\phi A$ by effecting a seal-in condition at the input of the OR gate 106. Concurrently, the blocking signal SPAB is generated blocking the AND gate 102 and passing the signal SPAB to the multi-phase trip logic shown in FIG. 5. Upon generation of the signal SPAB, the blocking signal BLK is multi-phase trip signal circuits. Should the circuit breaker of phase a be reclosed, the contact 52b closes disabling AND gate 108 and arresting the generation of the trip signal $\phi A$. However the blocking signal SPAB continues to be generated for the extended time duration of T as effected by the timer T3. The purpose of this extended blocking time is to allow reclosure of the breakers for a predetermined time T before allowing them to be retripped.

Figure 7:
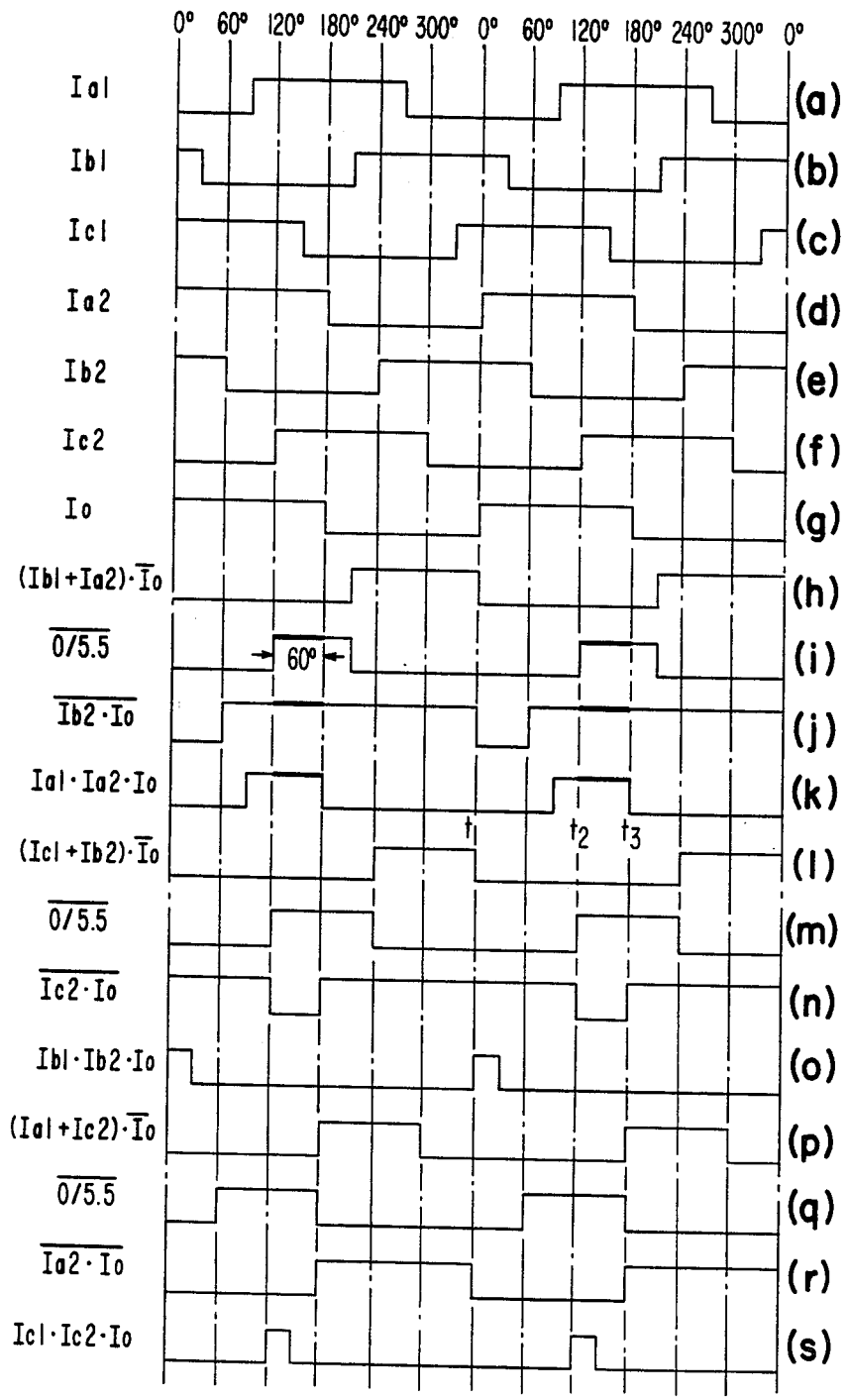

The next operational example, depicted by the time waveforms of FIG. 7, illustrates what happens during a phase a-to-ground fault with heavy load current in the transmission segment. Note, the time delay of timer T1 is represented in the time waveform i from t1 to t2. The highlighted or darkened areas of the time waveforms i, j and k represent the time during which the logical combination exists at the inputs of AND gate 100 to effect an output signal generated by the gate 100. Since the generation time, i.e. between t2 and t3, is greater than 2.4 milliseconds or approximately 52° in phase, single pole trip signal is caused to be generated as described above None of the other sets of time waveforms m, n, o or q, r, s reflect a similar tripping logical condition. Both the sealing-in and blocking of multi-phase trips similarly occur as described in connection with the previous example. Thus, even under the exceptional condition of heavy load current, a trip signal is selectively and exclusively generated by the apparatus 52 (52').

Figure 8:
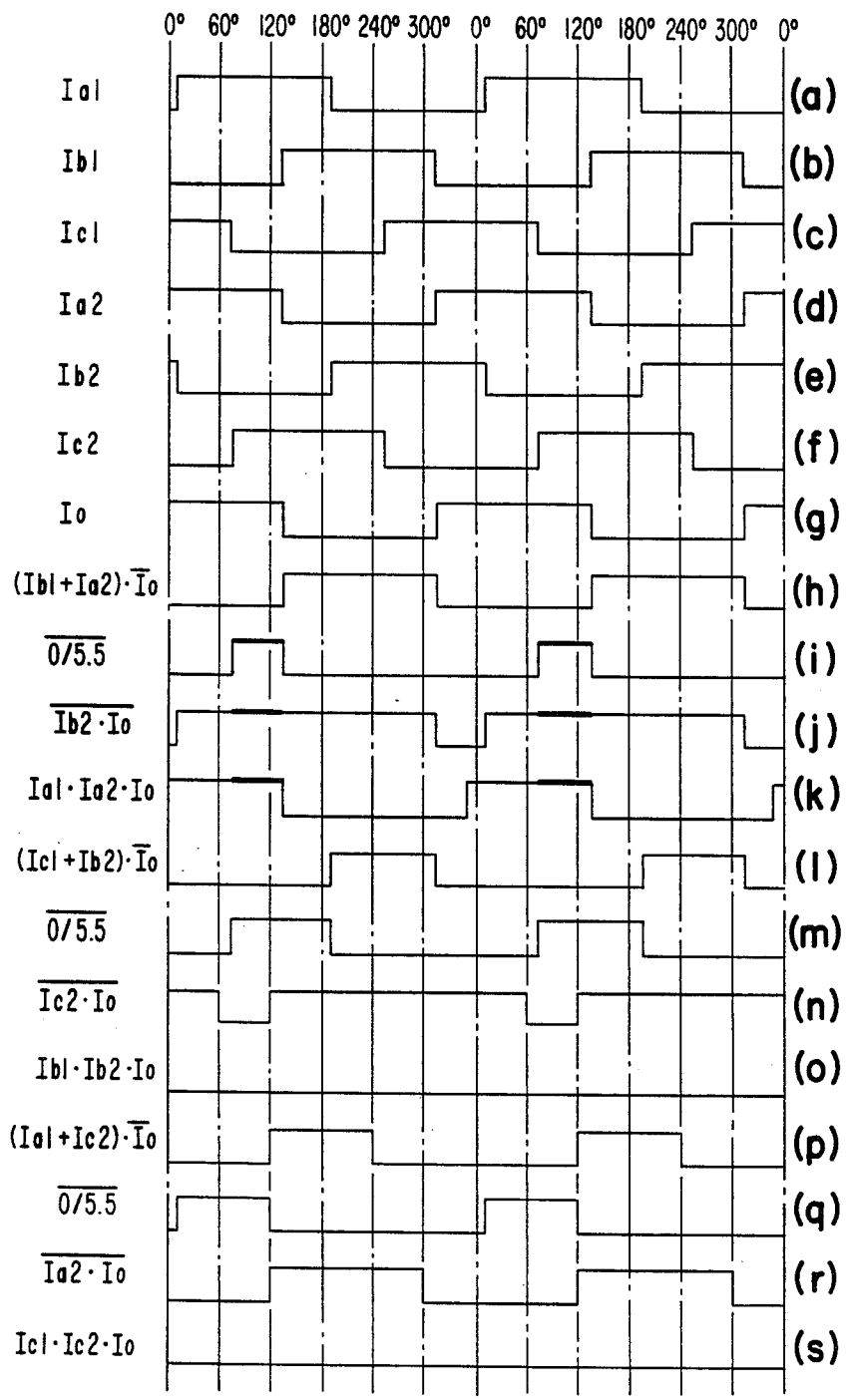

The next example, depicted by the time waveforms of FIG. 8, relates to a phase a-to-ground fault with heavy load current and high fault impedance. In this example, the absolute value of the fault current is approximately equal to the absolute value of the load current. Referring to the time waveforms i, j and k, the darkened sections indicate the time interval over which the gate 100 effects an output signal. The time duration is on the order of 60° in phase which is greater than the 52° delay of timer T2. Thus, a single phase a trip is triggered and is maintained by the 12 millisecond signal generation extension of the second delay time of the timer T2. The other signal sets m, n, o, and q, r, s do not exhibit the proper logical combination to cause a triggering of their corresponding phase-to-ground trip signals.

Figure 9:
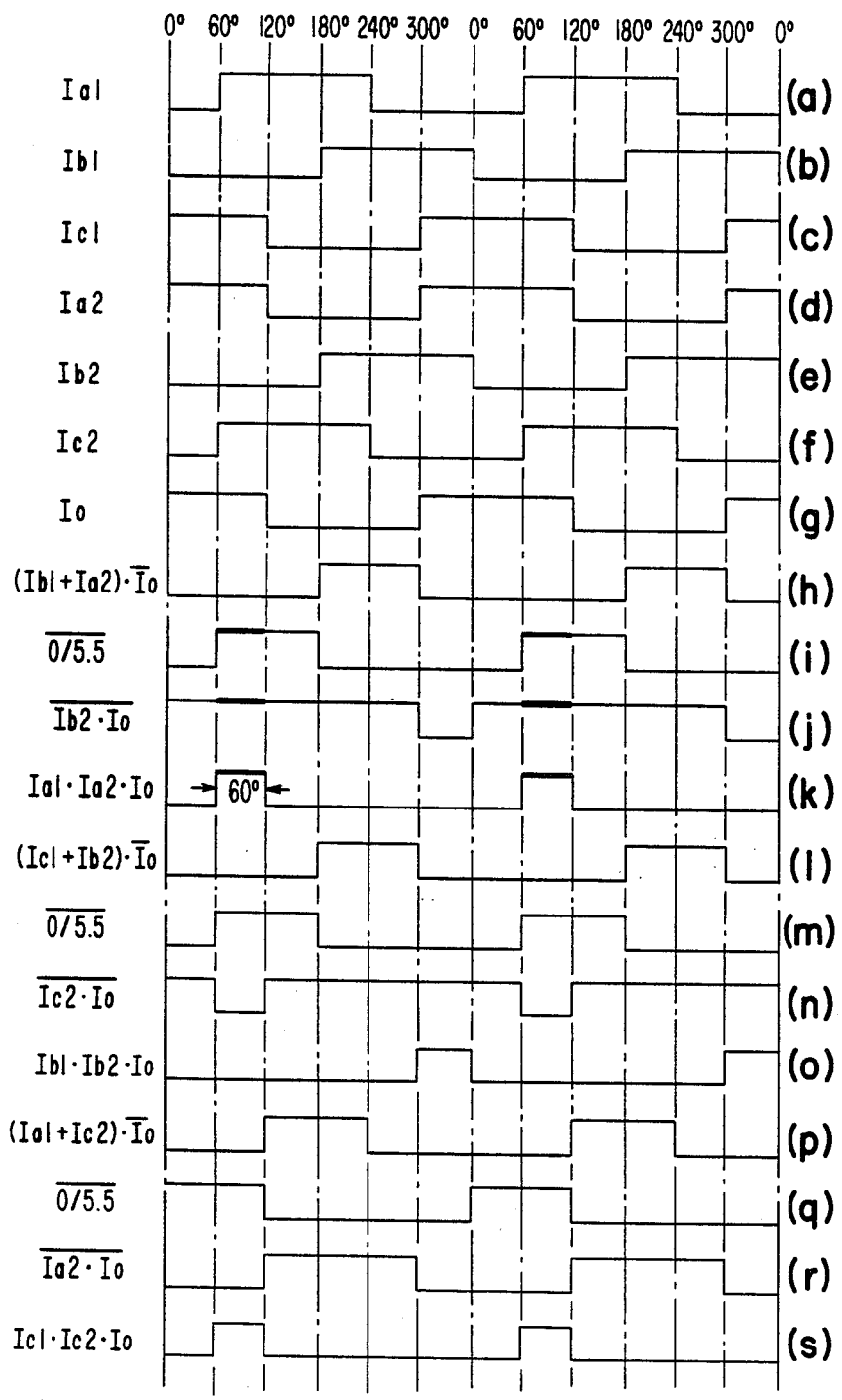

The example, as exhibited by the time waveforms of FIG. 9, illustrates the triggering of a phase a-to-ground trip signal with the conditions of heavy load current and high fault resistance with the absolute value of the load current being on the order of 1.5 times the absolute value of the fault current. Once again, the heavily darkened or highlighted portions of the time waveforms i, j and k represent the logical combination for gate 100 to effect an output signal to the timer T2. The time duration of the logical combination exceeds the 52° delay (2.4 ms) of timer T2 thus permitting the phase a-to-ground trip signal $\phi$A to be generated and maintained by the 12 ms time delay of timer T2. Since the other sets of signals do not have the logical combination necessary to trigger thier corresponding phase-to-ground trip signal, the phase a trip signal is exclusive.

Figure 10:
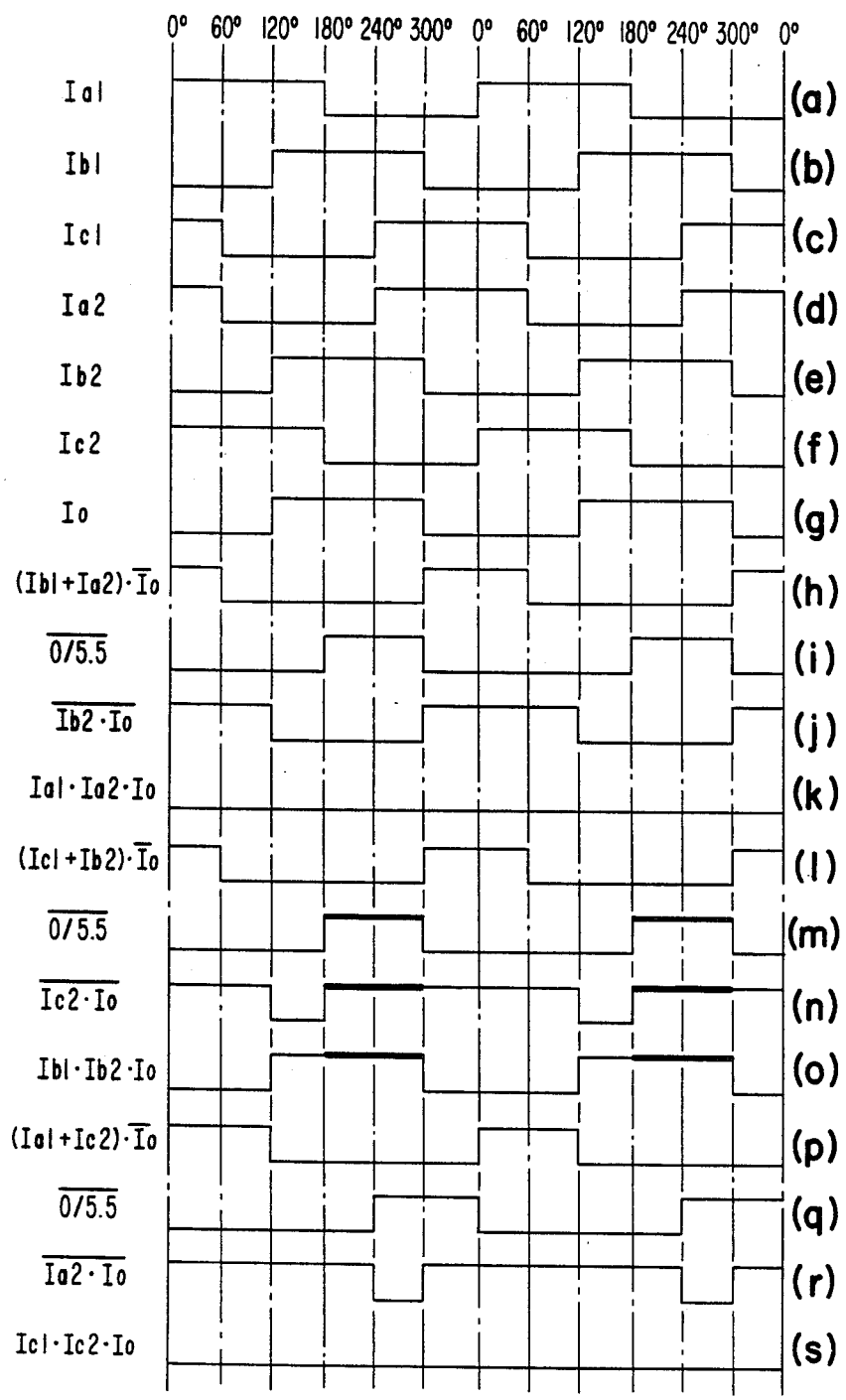
Figure 11:
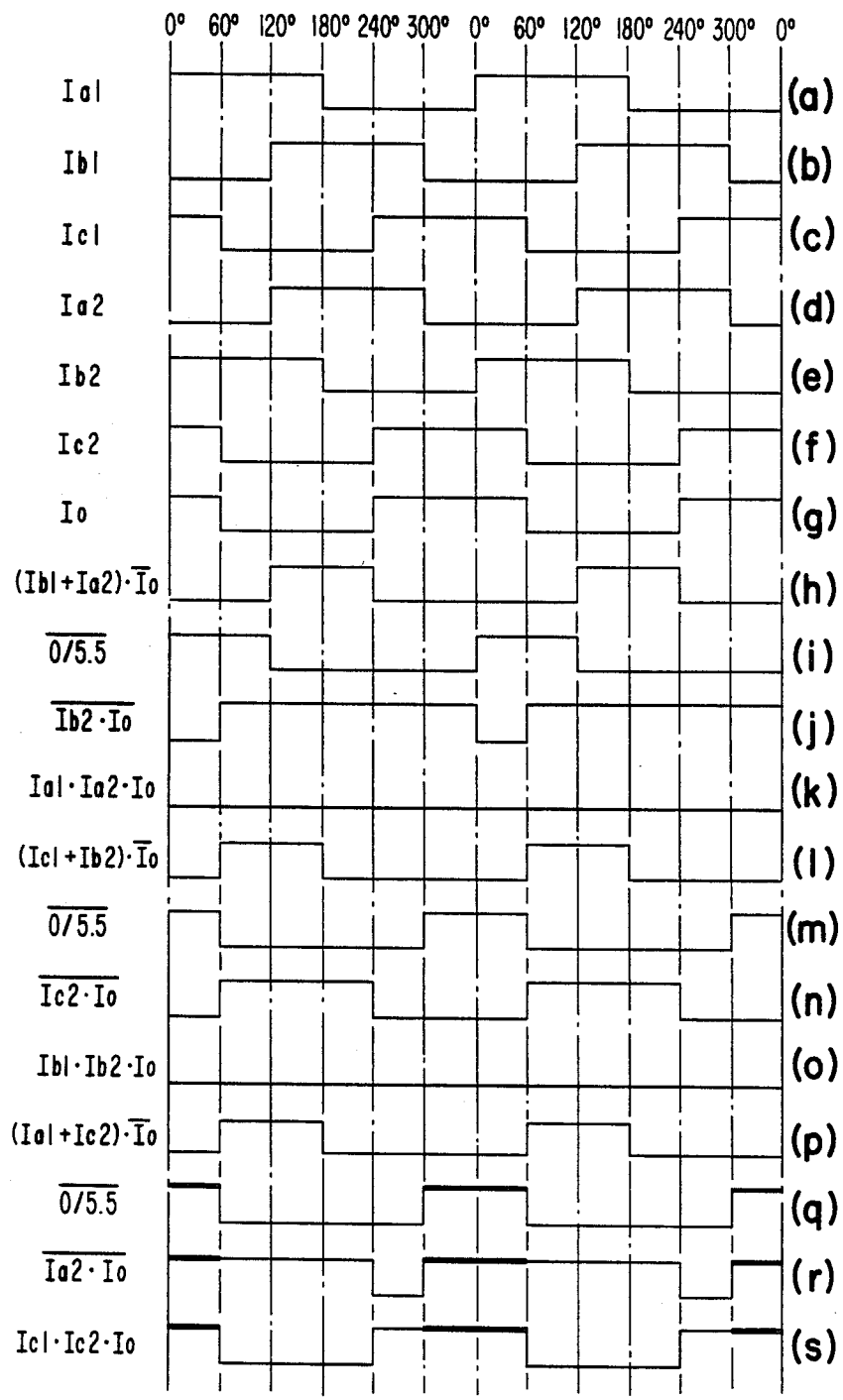

FIG. 10 and 11 exhibit the time waveform examples for a phase b-to-ground fault and phase c-to-ground fault conditions, respectively. In each case, the heavily darkened or highlighted portions of the appropriate set of time waveforms indicate ample time duration to trigger the corresponding single phase-to-ground trip signal. Since none of the other sets of time waveforms exhibit the necessary logical combinations, the corresponding single phase-to-ground trip signal is triggered exclusively.

Figure 12:
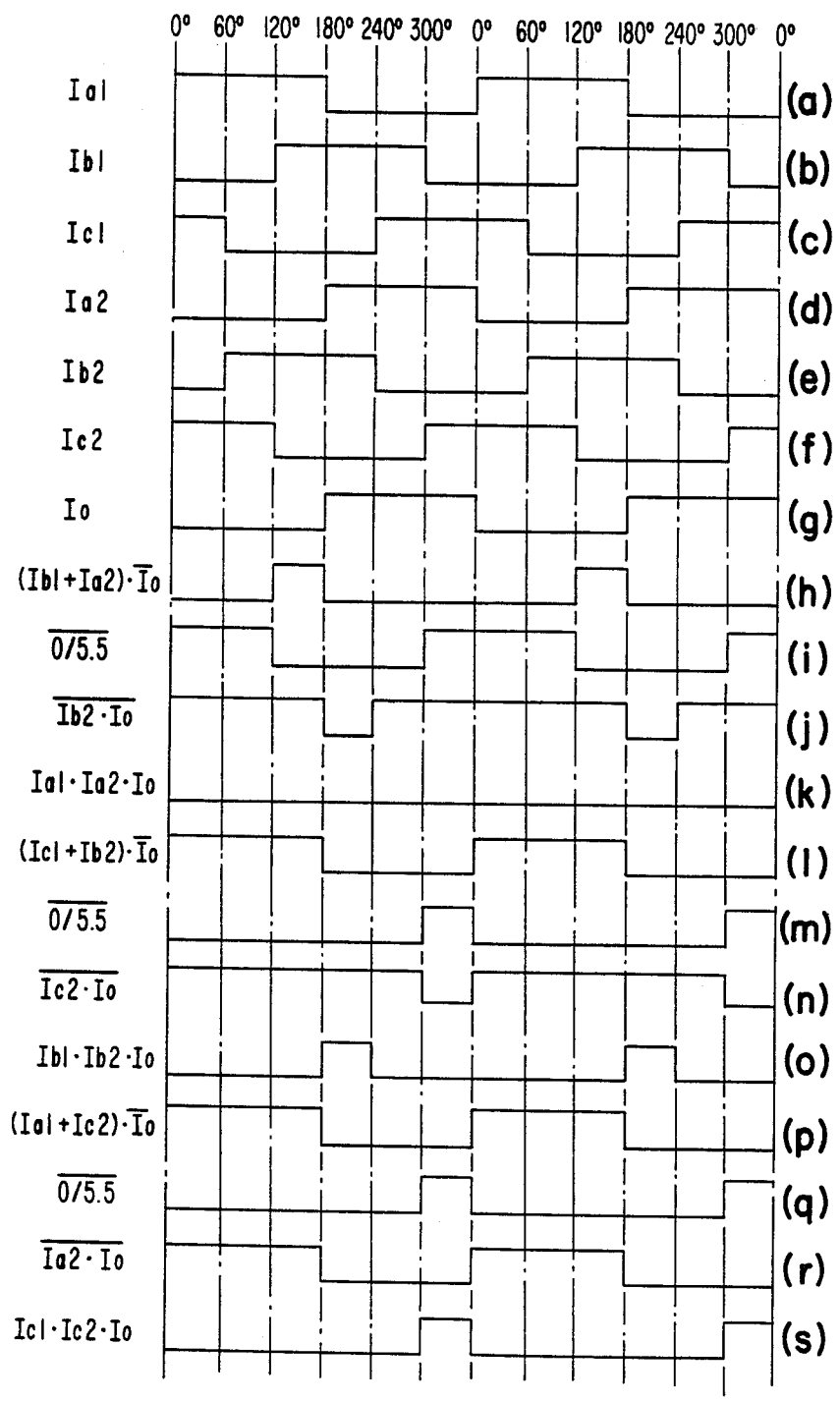
Figure 13:
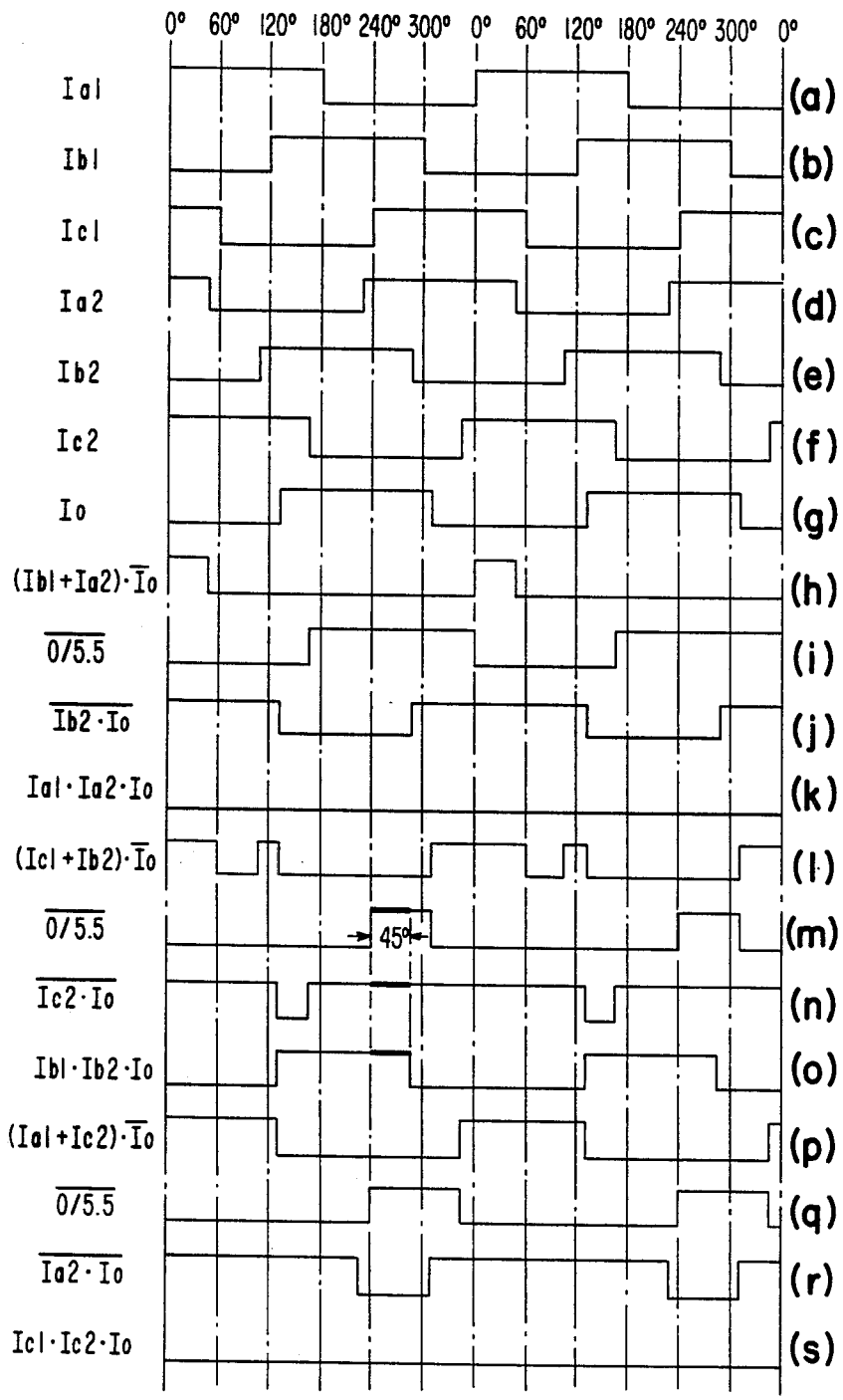
Figure 16:
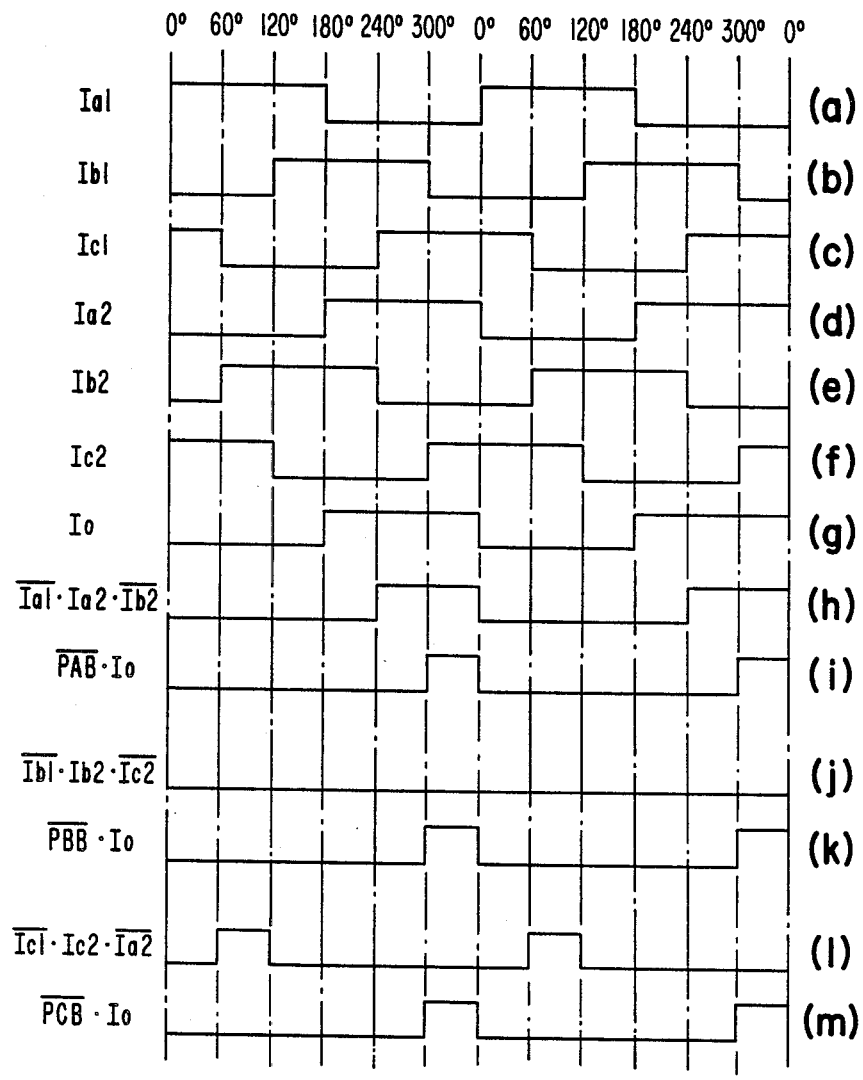

Both FIGS. 12 and 13 are examples of phase b-to-phase c-to-ground fault. FIG. 12 exhibits the time waveform conditions with no substantial load current and FIG. 13 exhibits conditions with high fault impedance. In neither case is there produced the necessary logical combination of signals for the sufficient time duration to cause corresponding single phase-to-ground fault. FIG. 16, on the other hand which exhibits the time waveforms of the signals of the multi-phase circuitry depicted in FIG. 5 illustrates the logical combination of signals for a phase b-to-phase c-to-ground fault.

Referring to FIG. 16, the time waveform h represents the output of the logical gate 120 which governs the gates 122 and 124 and the time waveform i represents the "AND"ed combination of signals $\overline{PAB}$ and to which are the other two inputs to gate 122. Thus, if signals h and i are both logically "high" for a period of time greater than the 1.0 microsecond delay of timer T4, a signal is provided to the input of gate 138 to initiate a bc-ground fault. Similarly, the time waveforms j and k represent the outputs of the gates 126 and 128 which govern respectively the gates 130 and 140, subject to the delay timer T5. Likewise the time waveforms i and m represent the outputs of the gates 132 and 134 which govern accordingly the gates 136 and 144, subject to the delay timer T6. The gates 124, 130 and 136 generates the corresponding phase-to-phase trip signal and the gates 138, 140 and 144 generate the corresponding phase-to-phase-to-ground trip signal.

As a result of the conditions manifested by the time waveforms h-m of FIG. 16, only time waveforms h and i are coincident (see darkened lines) for a time period greater than the 1.0 microsecond delay of the times T4–T6. Thus, given the detection of an internal fault IT and no blocking signals SPAB, SPEB, or SPCB, then only the trip signal $\phi$BC-G is caused to be generated by the gate 138. No coincidence occurs between signals j and k or between signals l and m. Also, gates 124, 130 and 136 are blocked from generating their respective phase-to-phase fault signals by the blocking signals of their respective "OR"gates 146, 148 and 150 which are governed by related signals from the time waveform a–g. For example, the signal of time waveform h governs gate 124 except under the conditions when either signals Ic2 or signal Io is "high"Similarly, the signal of waveform j governs gate 130 except when blocked by either signal Ia2 or Io and likewise, the signal of waveform i governs gate 136 except when blocked by either signal Ib2 or Io. Therefore, in the example depicted in FIG. 16, only signal $\phi$BC-G is generated via AND gate 138.

Figure 14:
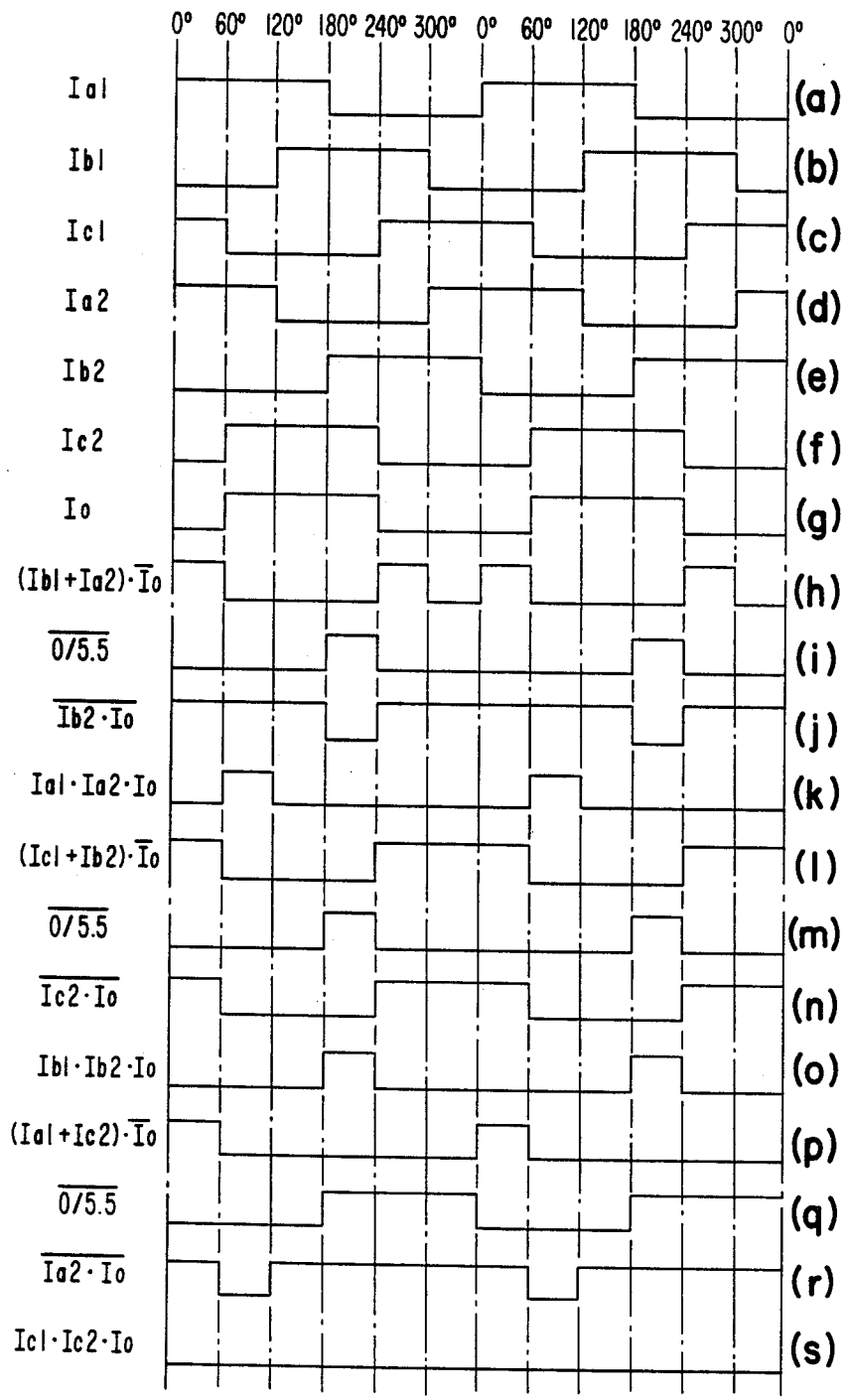
Figure 15:
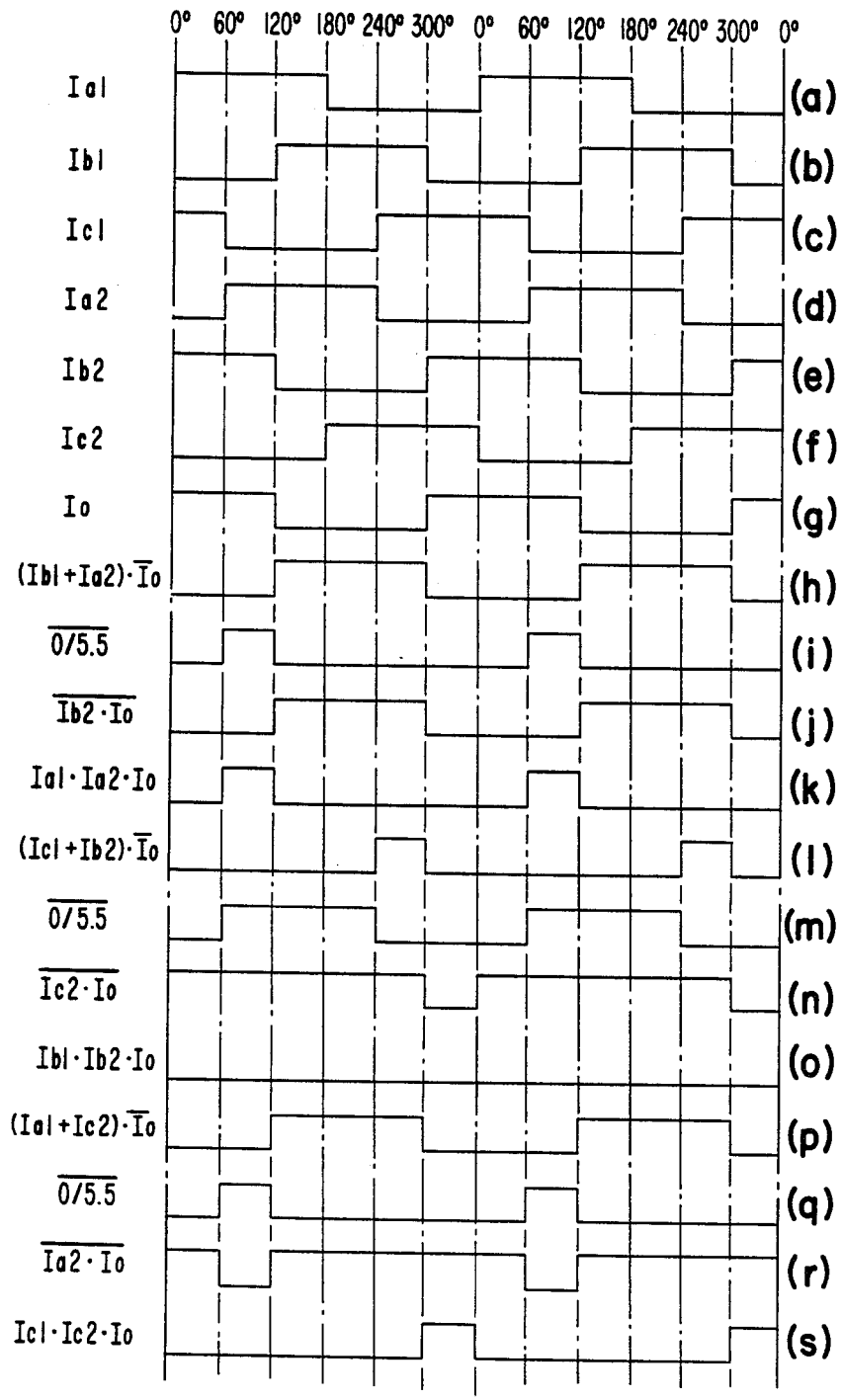

FIGS. 14 and 15 exhibit the signal time waveform for the conditions of a phase a-to-phase b-to-ground fault and a phase c-to-phase a-to-ground fault with no substantial load current in the transmission segment. Note that the sets of signals of the AND gate 100 in each of the circuits 74, 76 and 78 do not have the necessary logical combination for the time duration to generate their corresponding trip signals. Thus, no single phase-to-ground trip signal is generated for any of the phases.

Figure 17:
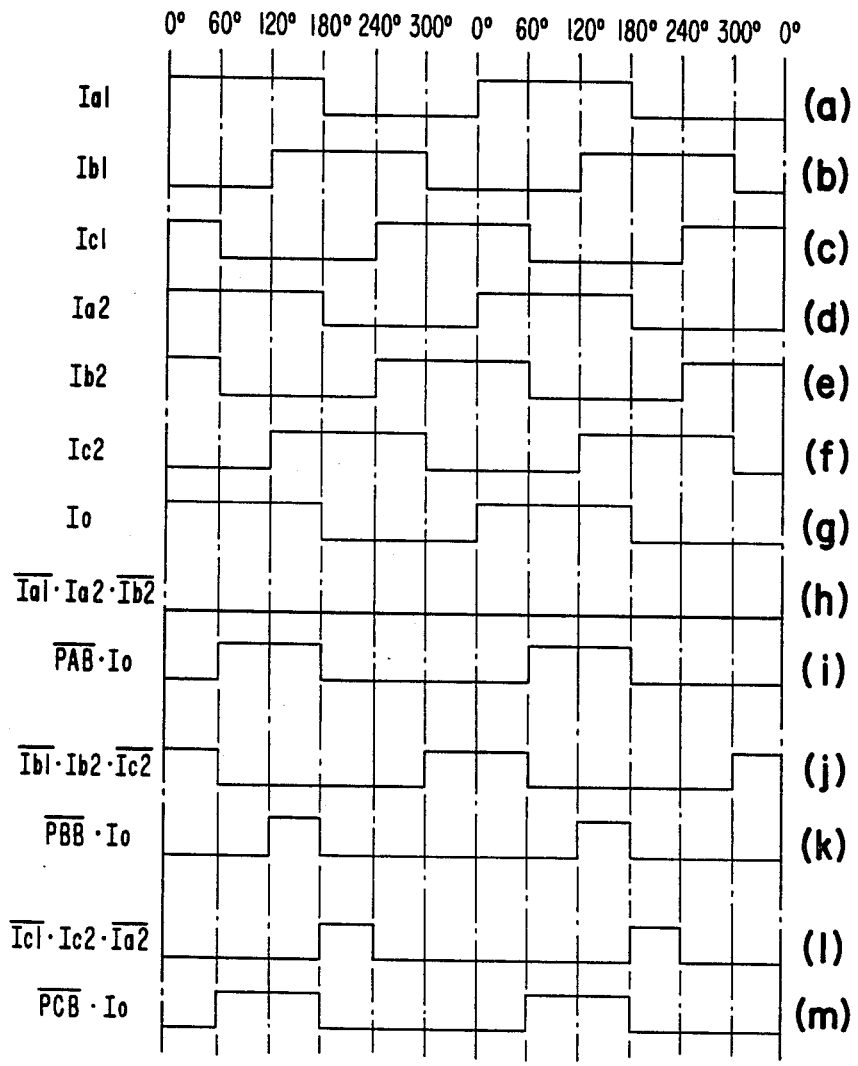

FIG. 17 like FIG. 16 exhibits the time waveforms for the multi-phase logic circuitry of FIG. 5 under a single phase a-to-ground fault condition with no substantial load current. Note that none of the time waveform signals h–m exhibit the necessary logical combination and time duration to cause a corresponding trip signal. Also, as indicated above, the blocking signal BLK inhibits any possibility of a trip signal generation.

Figure 18:
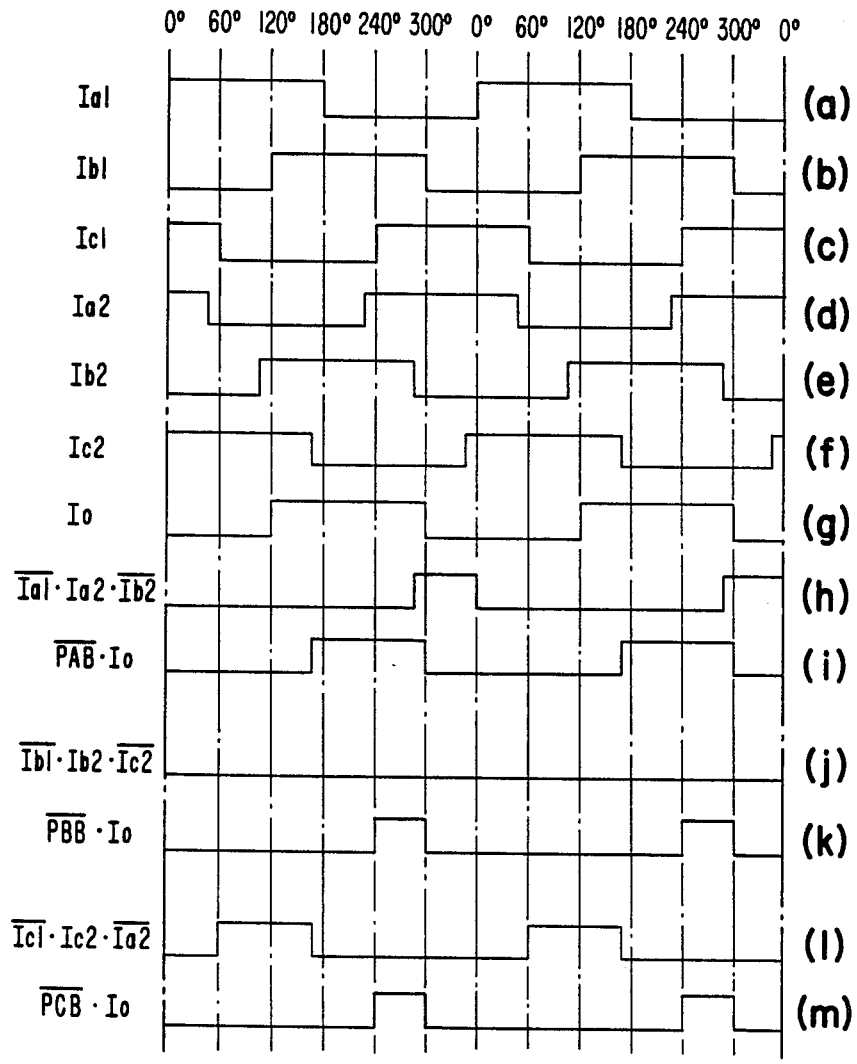

The last of the examples is depicted in the time waveforms of FIG. 18 which are similar to those described in connection with FIG. 16, but relate to a phase b-to-phase c-to-ground fault condition with high fault impedance. Note that only the signals depicted by the time waveforms of h and i exhibit conditions for a trip signal generation illustrating the capability of the multi-phase logic circuitry to segregate one type of fault condition from another and to select the generation of the proper trip signal corresponding to the segregated fault condition. More specifically, only waveforms h and i are coincident for greater than 1 millisecond which causes a $\phi$BC-G signal generation via AND gate 138. The remaining waveforms j and k and l and m are non-coincident with time, thus their respective fault signals are not caused to be generated. Accordingly, signal $\phi$BC-G is exclusively generated.

While the inventive concept has been described hereabove in connection with a particular embodiment shown in FIGS. 3, 4 and 5, it is understood that modifications and additions may be made to the described embodiment without deviating from the present invention. Accordingly, the present invention should not be limited to any one particular embodiment but rather construed in breadth and broad scope according to the recitation of the appended claims.

What is claimed is:

1. A current only monitoring protective relay system for protecting an electrical energy transmission segment of a power system network against faults, the segment comprising three (3)-phases A, B and C and having local and remote ends, the relay system including a current measuring means for each local and remote end of the segment to measure the current of each of the phases A, B and C at its corresponding end and generate phase current signals Ia, Ib and Ic representative thereof; and local and remote protective relays, each responsive to the phase current signals Ia, Ib and Ic correspondingly associated therewith to detect an internal fault condition of the segment and to generate an internal trip signal indicative of said condition, each protective relay including means for performing selective-pole trip determination comprising:

sequence network means for converting said corresponding phase current signals Ia, Ib and Ic into positive and negative sequence component signals Ia1 and Ia2, respectively, for phase A, Ib1 and Ib2, respectively, for phase B and Ic1 and Ic2, respectively, for phase C and a zero sequence component signal Io;

first logic means governed by the internal trip signal and the sequence component signals Ia1, Ia2 and Io and phase shifted variations thereof to detect a single-pole fault exclusively in phase A and to generate a single-pole trip signal φA in response to said detection;

second logic means governed by the internal trip signal and the sequence component signals Ib1, Ib2 and Io and phase shifted variations thereof to detect a single-pole fault exclusively in phase B and to generate a single-pole trip signal φB in response to said detection;

third logic means governed by the internal trip signal and the sequence component signals Ic1, Ic2 and Io and phase shifted variations thereof to detect a single-pole fault exclusively in phase C and to generate a single-pole trip signal φC in response to said detection;

first circuit means for generating a provisional single-pole fault signal based on substantial coincidence of the corresponding positive, negative and zero sequence component signals;

second circuit means for generating a first blocking signal based on a first logical combination of the corresponding positive sequence component signal phase shifted substantially by two-hundred and forty degrees (240°), the corresponding negative sequence component signal and the zero sequence component signal phase shifted substantially by one-hundred and eighty degrees (180°);

third circuit means for generating a second blocking signal based on a second logical combination of the corresponding negative sequence component signal phase shifted substantially by one-hundred and twenty degrees (120°) and the zero sequence component signal; and fourth circuit means governed by the provisional single-pole fault signal, the first and second blocking signals and the internal trip signal to generate the corresponding single-pole trip signals.

2. The protective relay system in accordance with claim 1 wherein each second circuit means includes a first timer means for extending the generation of the first blocking signal for a first predetermined time interval beyond the time when the first logical combination of signals ceases to exist.

3. The protective relay system in accordance with claim 1 wherein each fourth circuit means includes: means for generating a first intermediate signal based on a third logical combination of the provisional single-pole fault signal and first and second blocking signals; a second timer means for generating a second intermediate signal should said third logical combination of signals exist for a second predetermined time interval and for extending the generation of said second intermediate signal for a third predetermined time interval beyond the time when the third logical combination of signals ceases to exist; and means for generating the corresponding single-pole trip signal based on a fourth logical combination of said second intermediate signal and the internal trip signal.

4. The protective relay system in accordance with claim 3 further comprising local and remote breaker means governed by at least one corresponding single-pole trip signal for interrupting current through the phase of the segment selected by each governing single-pole trip signal; and wherein each fourth circuit means further includes means for generating a signal to seal-in the generation of its corresponding single-pole trip signal based on the status of its corresponding breaker means.

5. The protective relay system in accordance with claim 4 wherein each fourth circuit means further includes third timer means governed by the seal-in signal to generate a third blocking signal and to extend the generation of said third blocking signal for a fourth predetermined time interval beyond the time when the seal-in signal generation is arrested and to block the generation of the corresponding single-pole trip signal during said fourth predetermined time interval.

6. The protective relay system in accordance with claim 1 wherein the sequence network means includes means for generating all of the sequence component signals as square waveforms having first and second states, the waveform transitions between said first and second states representing phase angle relationships of the sequence component signals with respect to each other.

7. The protective relay system in accordance with claim 1 wherein each selective-pole trip determining means further includes:

fifth circuit means governed by a logical combination of the positive and negative sequence component signals Ia1 and Ia2 respectively and the negative sequence component signal Ib2 to generate a first logic signal;

sixth circuit means governed by a logical combination of the positive and negative sequence component signals Ib1 and Ib2, respectively, and the negative sequence component signal Ic2 to generate a second logic signal;

seventh circuit means governed by a logical combination of the positive and negative sequence component signals Ic1 and Ic2, respectively, and the negative sequence component Ia2 to generate a third logic signal;

fourth logic means governed by the first logic signal and the internal trip signal to generate a phase B to phase C fault signal;

fifth logic means governed by the first logic signal, the first blocking signal of the first logic means, the zero sequence component signal and the internal trip signal to generate a phase B-to-phase C-to-ground fault signal, said fault signal generation being blocked by the first blocking signal of the first logic means;

sixth logic means governed by the second logic signal and the internal trip signal to generate a phase C-to-phase A fault signal;

seventh logic means governed by the second logic signal, the first blocking signal of the second logic means, the zero sequence component signal and the internal trip signal to generate a phase C-to-phase A-to-ground fault signal, said fault signal generation being blocked by the first blocking signal of the second logic means;

eighth logic means governed by the third logic signal and the internal trip signal to generate a phase A-to-phase B fault signal; and ninth logic means governed by the third logic signal, the first blocking signal of the third logic means, the zero sequence component signal and the internal trip signal to generate a phase A-to-phase B-to-ground fault signal, said fault signal generation being blocked by the first blocking signal of the third logic means.

8. The protective relay system in accordance with claim 7 wherein each fourth circuit means of the first, second and third logic means includes means for generating a single-pole blocking signal as governed by the single-pole fault signal and for extending the generation of the single-pole blocking signal for a predetermined time interval from the time that the single-pole fault signal is arrested; wherein each selective-pole trip determining means further includes means for blocking the fourth through the ninth logic means inclusively from generating their corresponding fault signals based on the generation of at least one of said single-pole blocking signals by the first, second and third logic means.

9. The protective relay system in accordance with claim 8 wherein each selective-pole trip determining means further includes means governed by the positive sequence component signal Ia1, the internal trip signal, and the negative sequence component signals Ia2, Ib2 and Ic2 to generate a three phase fault signal, said fault signal generation being blocked by the generation of at least one of the single-pole blocking signals by the first, second and third logic means.

10. The protective relay system in accordance with claim 7 wherein each selective-pole trip determining means further includes;

means governed by the zero sequence component signal to generate a fourth logic signal when the amplitude of the zero sequence component signal is greater than a reference signal;

eighth circuit means governed by said fourth logic signal and the negative sequence component signal Ic2 to block the fourth logic means from generating the phase B-to-phase C fault signal;

ninth circuit means governed by said fourth logic signal and the negative sequence component signal Ia2 to block the sixth logic means from generating the phase C-to-phase A fault signal; and tenth circuit means governed by said fourth logic signal and the negative sequence component signal Ib2 to block the eighth logic means from generating the phase A-to-phase B fault signal.

* * * * *